United States Patent [19]

Johannesen et al.

[11] 4,197,927
[45] Apr. 15, 1980

[54] BAND BRAKE AND ACTUATOR THEREFOR

[75] Inventors: Donald D. Johannesen; Orla Lee Holcomb, Jr.; Andrew F. Kazmierzak, all of South Bend, Ind.

[73] Assignee: The Bendix Corporation, Southfield, Mich.

[21] Appl. No.: 892,540

[22] Filed: Apr. 3, 1978

[51] Int. Cl.² ............................................. F16D 49/12
[52] U.S. Cl. ................................. 188/77 R; 188/365; 192/80; 192/99 B
[58] Field of Search .................. 188/77 R, 77 W, 365, 188/75; 192/80, 81 R, 81 C, 79, 99 B

[56] References Cited

U.S. PATENT DOCUMENTS

| | | | |
|---|---|---|---|
| 2,014,903 | 9/1935 | Logan, Jr. | 188/77 R |
| 2,098,125 | 11/1937 | Yoxall | 188/77 R |
| 2,167,171 | 7/1939 | Dodge | 188/77 R |
| 2,641,338 | 6/1953 | Findley | 188/77 W X |
| 3,116,817 | 1/1964 | Quick et al. | 188/77 R X |
| 3,245,499 | 4/1966 | Kershner | 188/365 X |

FOREIGN PATENT DOCUMENTS

| | | | |
|---|---|---|---|
| 639240 | 5/1962 | Italy | 192/80 |
| 11850 | of 1900 | United Kingdom | 188/77 R |

*Primary Examiner*—George E. A. Halvosa
*Attorney, Agent, or Firm*—Paul D. Schoenle; Ken C. Decker

[57] ABSTRACT

A band brake assembly includes a band which carries a friction lining for engagement with a rotatable member. A casing surrounds the band and a hydraulic actuator cooperates with a pair of links which are engaged with respective ends of the band. When the hydraulic actuator is operated, the hydraulic actuator is moved toward the rotatable member such that the pair of links are pivoted oppositely about the moving hydraulic actuator. The pivoting links are coupled to the band such that movement of the hydraulic actuator causes the band to contract the friction lining into engagement with the rotatable member. The pair of links are optionally provided with rollers which roll on the casing and the hydraulic actuator when the latter is operated. It is also possible to eliminate the casing so that the rollers roll on the band when the hydraulic actuator is operated.

1 Claim, 2 Drawing Figures

BAND BRAKE AND ACTUATOR THEREFOR

BACKGROUND OF THE INVENTION

Band brakes generally provide a band with a friction lining for engagement with a rotatable member. In order to actuate the band brake, the bands are coupled to an actuator which is moved away from the rotatable member to engage the friction lining with the latter. Such band brakes engage only a portion of the friction lining with the rotatable member as the ends of the band are pulled away from the rotatable member.

SUMMARY OF THE INVENTION

The present invention relates to a band brake and the apparatus used to actuate the band brake. The band brake includes a band with a friction lining which is engageable with a rotatable member when the band brake is actuated. The band terminates in respective ends which criss-cross each other. The ends of each band are coupled to a link and each link is pivotally supported by a pin which carries a roller engaging the hydraulic actuator. In order to actuate the band brake, the hydraulic actuator is moved toward the rotatable member to contract the friction lining into engagement with the rotatable member.

In one form of the present invention, the links carry rollers which roll over the band when the hydraulic actuator is operated. In particular, one end of the band connects with one link and the roller carried by the one link rolls over the other end of the band. Consequently, the rollers impart a force urging a portion of the friction lining into engagement with the rotatable member at the same time that the friction lining is radially contracted into engagement with the rotatable member.

DETAILED DESCRIPTION

Figure 1:
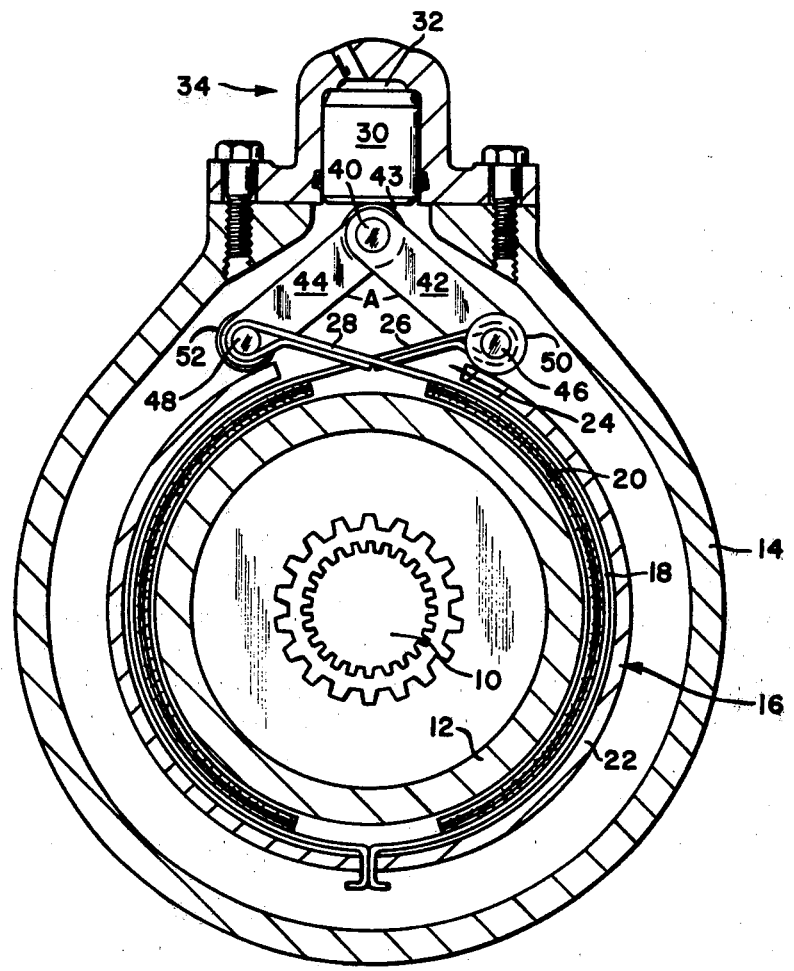
FIG. 1 is a side view of a band brake assembly constructed in accordance with the present invention.

In the band brake assembly of FIG. 1, an axle shaft 10 carries a rotatable member 12 for rotation therewith. A housing 14 rotationally supports the axle shaft 10 by any suitable means and forms a radial clearance with the rotatable member 12. Within the radial clearance is disposed a band 16 which comprises a metal strap 18 and a friction lining 20.

The friction lining 20 substantially surrounds the rotatable member and the strap 18 is long enough to overlap at the ends of the strap. A casing 22 is also disposed within the radial clearance between the housing 14 and the rotatable member 12. The casing substantially encloses the band 16 and forms an aperture 24 at which the end 26 and the end 28 of the strap 18 extend radially outwardly from the casing 22 and overlap with each other.

The housing 14 cooperates with a piston 30 to form a pressure chamber 32 and the piston 30 and pressure chamber 32 substantially define a hydraulic actuator 34. The pressure chamber 32 communicates with a pressure source (not shown) to communicate pressurized fluid to the pressure chamber, thereby urging the piston 30 toward the rotatable member when the hydraulic actuator 34 is actuated.

A pin 40 connects with the link 42 and the link 44 and carries a roller 43 engaging the piston 30. The link 42 also carries a pin 46 for connecting the end 26 of strap 18 with the link 42 and the link 44 carries a pin 48 for connecting the end 28 of the strap 18 with the link 44. In addition, the pins 46 and 48 support rollers 50 and 52 which are engageable with the casing 22 and roll over a portion of the outer surface of the casing 22. In the brake released position, the friction lining 20 is radially spaced from the rotatable member 12 and the pair of links 42, 44 form an angle A relative to each other about the pin 40.

Figure 2:
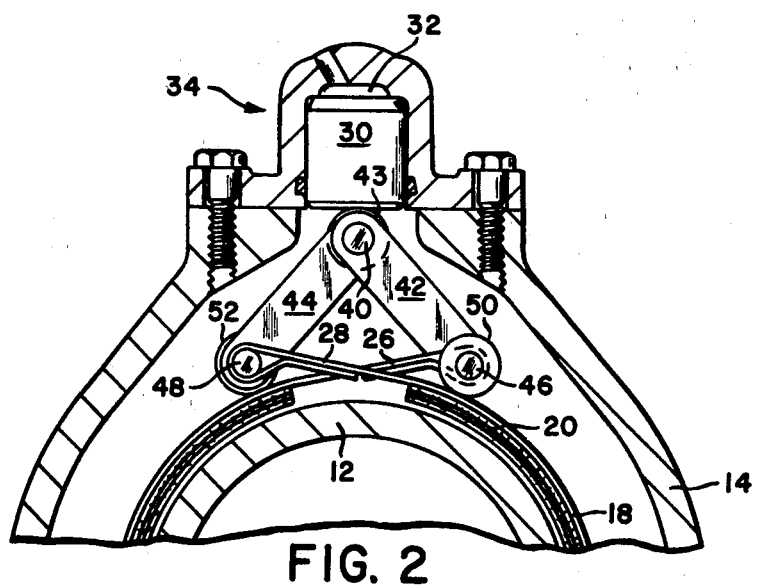
FIG. 2 is a side view of an alternative embodiment of a band brake assembly constructed in accordance with the present invention.

Turning to the embodiment of FIG. 2, it is seen that the casing 22 is omitted so that the rollers 50 and 52 roll on the portion of the strap adjacent ends 28 and 26, respectively.

MODE OF OPERATION

In order to effectuate a braking application of the rotatable drum 12, the hydraulic actuator 34 is actuated by communicating pressurized fluid to the pressure chamber 32, thereby urging the piston 30 toward the rotatable member. As the strap end 26 is coupled to the end of link 42 via pin 46 and the strap end 28 is coupled to the end of link 44 via pin 48, the movement of the piston 30 and pin 40 toward the rotatable member 12 causes the rollers 50 and 52 to roll over the outer surface of casing 22, thereby increasing the angle of A. With the rollers 50 and 52 rolling over the outer surface of the casing 22, the pins 46 and 48 move along the outer surface of the casing also to pull the strap end 26 with the moving pin 48. Consequently, the strap 18 is radially contracted about the rotatable member to engage the friction lining 20 into engagement with the rotatable member 12 to retard rotation of the latter.

In the embodiment of FIG. 2, the hydraulic actuator 34 and the pair of links 42, 44 cooperate in a similar manner to effectuate a braking application; however, the rollers 50 and 52 roll over the strap 18. Consequently, during a braking application, the force of pressurized fluid in chamber 32 urging the piston 30 toward the rotatable member 12 is transmitted through the links 42 and 44 and corresponding rollers 40 and 52 to impart a transverse force on the portion of the friction lining adjacent strap ends 26 and 28 in addition to the radial contraction caused by the pull of the strap ends 26 and 28 when the rollers 50 and 52 move over the outer surface of the strap 18.

Although both links carry rollers remote from the piston, it is within the scope of the present invention to eliminate the rollers so that the links terminate in a sliding engagement with the casing or strap remote from the pivotal connection with the piston.

In conclusion, there are many other variations of the present invention which are obvious to one skilled in the art and it is intended that these variations are included within the scope of the appended claims.

We claim:

1. In a band brake, the combination of, a housing, a rotatable member disposed within said housing, a band substantially surrounding said rotatable member and being engageable with said rotatable member to retard rotation thereof, a casing substantially enclosing said band and defining an opening for receiving overlapping ends of said band, said housing cooperating with a pressure responsive member to substantially form a hydraulic actuator, and a pair of links connecting said hydraulic actuator with said ends, said hydraulic actuator being movable toward said rotatable member to contract said band into engagement with said rotatable member via said pair of links, said pair of links terminating in rollers which are engageable with said casing and movable relative to said casing in response to movement of said hydraulic actuator toward said rotatable member, each link of said pair of links extending from a common connection with said hydraulic actuator to one of said rollers, said pair of links also terminating in pins remote from said hydraulic actuator which support said rollers and also connect said pair of links with said ends of said band, and said casing forming a radial clearance with said housing to movably receive said rollers within said radial clearance.

* * * * *